(No Model.)
C. W. WILDER.
LUBRICATOR FOR LOOSE PULLEYS.
No. 400,885. Patented Apr. 2, 1889.
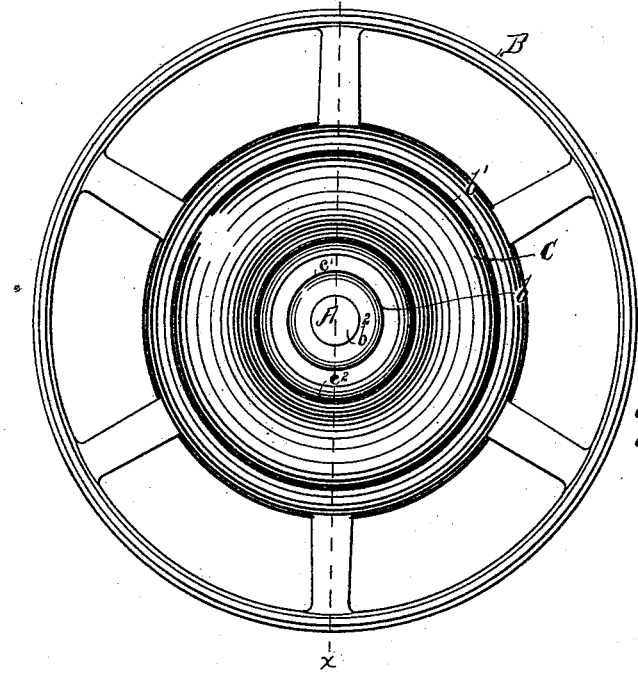
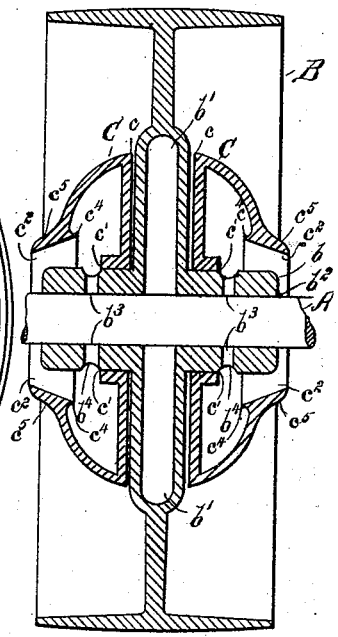
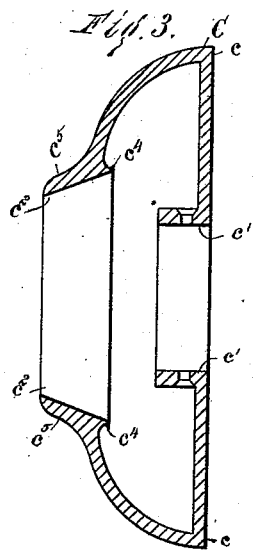
Witnesses_
Kirkley Hyde,
Gertrude M. Day,
Inventor_
Charles W. Wilder,
By Albert M. Moore,
His Attorney_

UNITED STATES PATENT OFFICE.

CHARLES W. WILDER, OF FITCHBURG, ASSIGNOR, BY DIRECT AND MESNE ASSIGNMENTS, TO THOMAS C. ENTWISTLE, OF LOWELL, AND WILLIAM H. RANKIN, OF LAWRENCE, MASSACHUSETTS.

LUBRICATOR FOR LOOSE PULLEYS.

SPECIFICATION forming part of Letters Patent No. 400,885, dated April 2, 1889.

Application filed July 31, 1886. Serial No. 209,611. (No model.)

*To all whom it may concern:*

Be it known that I, CHARLES W. WILDER, a citizen of the United States, residing at Fitchburg, in the county of Worcester and Commonwealth of Massachusetts, have invented a certain new and useful Improvement in Lubricators for Loose Pulleys, of which the following is a specification.

My invention relates to lubricators for loose pulleys; and it consists, substantially, in an oil-chamber having a central opening at one end thereof adapted to receive and fit the hub of a loose pulley, and at the outer end thereof with an opening larger than said hub, and adapted when said chamber is in use to be placed outside of the end of said hub.

In the accompanying drawings, Figure 1 is an end elevation of a loose pulley to which my improvement is applied; Fig. 2, a vertical central longitudinal section of such a pulley provided with my improvements on the line $x\ x$ in Fig. 1; Fig. 3, a vertical central section of an oil-chamber constructed according to my invention detached.

A is a shaft; B, a loose pulley provided with a hub, $b$, of any ordinary construction, or the pulley may have a central circular oil-holder, $b'$, surrounding the eye $b^2$ and opening into said eye if desired.

The oil-chamber C is preferably of cast-iron and is circular in vertical cross-section, as shown in the drawings, one end of said chamber being a circle, $c$, provided with a central circular opening, $c'$, of a size to receive and fit the hub $b$ of said loose pulley B. The other end of the chamber C is provided with a central circular opening, $c^2$, larger than the hub to which the chamber C is intended to be applied. The opening $c^2$ flares inwardly, and the outer end, $c^5$, of the chamber (that is, the one that contains the opening $c^2$) may be curved or inclined, as shown, to meet the periphery of the circular end $c$. The oil-chamber C is so applied to the hub $b$ of the pulley as to allow the end having the larger opening, $c^2$, of the chamber to project slightly beyond the end of the pulley-hub. This is to enable the pulley to be oiled while running by inserting the nose of an oil-can in said opening $c^2$ without difficulty, and also to cause any oil thrown by centrifugal force from the end of said hub to be caught by the sides of said last-named opening and carried by centrifugal force along the inclined sides of said opening into the chamber C; but before the chamber C is applied to the hub the hub is provided with an annular groove, $b^4$, and in this groove one or more holes, $b^3$, are drilled from the outside of the hub into the eye $b^2$, said groove being at such a distance from the end of said hub that the holes $b^3$ will open at their outer ends into said chamber when the chamber is placed on the hub, as above specified. The opening $c^2$ has at its larger inner end an annular projection, $c^3$, into the chamber, or, in other words, a shallow groove, $c^4$, is formed around and close to the inner end of said opening $c^2$, the division between said groove and said opening being preferably a sharp edge, the object of said groove being to intercept the oil trickling down the inner surface of the outer end, $c^5$, of the chamber and prevent its getting on the inclined inner surface of the opening $c^2$, and thence dropping onto the hub $b$ near its outer end, and to carry such oil around said last-named opening into the bottom of the chamber C.

The construction above described enables any loose pulley to be rendered self-lubricating at a slight expense, and prevents any oil applied to said pulley from being thrown out by centrifugal force and defacing the building in which the pulley is used and injuring goods in process of manufacture in such building. It is designed to make the chamber of such a size as to contain a large quantity of oil, thus rendering it unnecessary to oil the pulley except at long intervals. The construction of the oil-chamber is so simple that it cannot get out of order. The chamber C performs the same functions whether the oil-holder $b'$ is used or omitted, said holder serving merely to catch and accumulate oil which runs along from said chamber on the shaft and is thrown by centrifugal force from the shaft into said holder.

I claim as my invention—

1. An oil-chamber provided at one end with an opening adapted to receive and fit the hub of a loose pulley and at the other end with an opening larger than said hub and adapted to surround and to extend beyond the outer end of said hub, as and for the purpose specified.

2. An oil-chamber circular in cross-section and provided at one end with a central opening adapted to receive and fit the hub of a loose pulley and at the other end with another central opening larger than said hub and adapted to extend beyond the end of said hub, as and for the purpose specified.

3. An oil-chamber provided at one end with a central opening adapted to receive and fit the hub of a loose pulley and at the other end with another central opening larger than said hub, the outer end of said last-named opening being adapted to extend beyond the end of said hub, said chamber being provided on the inner surface of its outer end with an annular groove surrounding said outer opening, as and for the purpose specified.

4. The combination of a loose pulley provided with a hub and an oil-chamber provided at one end with an opening to receive and fit said hub, the other end of said chamber extending beyond the end of said hub and having a central opening larger than said hub, said hub being provided with one or more oil-passages leading from the eye of said hub to the outside of the same within said chamber, as and for the purpose specified.

5. The combination of a loose pulley provided with a hub and an oil-chamber provided at one end with an opening to receive and fit said hub, the other end of said chamber extending beyond the end of said hub and having a central opening larger than said hub, said hub being provided with one or more oil-passages leading from the eye of said hub to the outside of the same within said chamber, and provided also with an external annular groove connecting the outer ends of said oil-passages, as and for the purpose specified.

6. The combination of a loose pulley provided with a hub and an oil-chamber provided at one end with an opening to receive and fit said hub, the other end of said chamber extending beyond the end of said hub and having a central opening larger than said hub and flaring inwardly and having an annular groove about said last-named opening, said hub provided with one or more oil-passages leading from the eye of said hub to the outside of the same within said chamber, as and for the purpose specified.

CHARLES W. WILDER.

Witnesses:
JAMES H. MCMAHON,
MILLARD F. JONES.